(12) United States Patent
Ihara et al.

(10) Patent No.: US 10,203,680 B2
(45) Date of Patent: Feb. 12, 2019

(54) ELECTRIC EQUIPMENT SYSTEM

(71) Applicant: Panasonic Intellectual Property Management Co., Ltd., Osaka (JP)

(72) Inventors: Hideki Ihara, Hyogo (JP); Kazunori Matsumoto, Osaka (JP); Yoshiaki Tanaka, Osaka (JP); Kousuke Takemura, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 15/409,995

(22) Filed: Jan. 19, 2017

(65) Prior Publication Data

US 2017/0131699 A1 May 11, 2017

Related U.S. Application Data

(63) Continuation of application No. 14/242,301, filed on Apr. 1, 2014, which is a continuation of application No. PCT/JP2012/005827, filed on Sep. 13, 2012.

(30) Foreign Application Priority Data

Oct. 6, 2011 (JP) .................................. 2011-221625

(51) Int. Cl.
  *B23K 9/10* (2006.01)
  *G05B 19/05* (2006.01)
  *G06F 3/00* (2006.01)

(52) U.S. Cl.
  CPC .............. *G05B 19/054* (2013.01); *B23K 9/10* (2013.01); *B23K 9/1087* (2013.01); *G06F 3/002* (2013.01);
  (Continued)

(58) Field of Classification Search
  CPC ...... B23K 9/10; B23K 9/1043; G05B 19/054; G06F 3/002; G06F 3/00
  (Continued)

(56) References Cited

U.S. PATENT DOCUMENTS 5,714,733 A 2/1998 Moro
6,107,601 A 8/2000 Shimogama
(Continued)

FOREIGN PATENT DOCUMENTS

EP 2 531 746 7/2014
EP 2 731 746 3/2016
(Continued)

OTHER PUBLICATIONS

International Search Report for International Application No. PCT/JP2012/005827 dated Oct. 16, 2012 with English translation.
(Continued)

*Primary Examiner* — Brian W Jennison
(74) *Attorney, Agent, or Firm* — Wenderoth, Lind & Ponack, L.L.P.

(57) ABSTRACT

An input/output device inputting and outputting information to an external device includes a control section for communicating with an external controller. Electric equipment for communicating with the input/output device includes an input/output assignment storing section for storing which port of an input circuit an input from the external device is assigned to, and which port of an output circuit an output is assigned to. The electric equipment also includes an electric-equipment-side input/output control section for operating a function of the electric equipment based on information from the control section, or transmitting, to the control section, the information indicating which port of the output circuit an output of the electric equipment is output to. The electric equipment, using the external controller, stores the
(Continued)

information related to the assignment in the input/output assignment storing section, or alters the information related to the assignment stored in the input/output assignment storing section.

9 Claims, 14 Drawing Sheets

(52) U.S. Cl.
CPC ............... *G05B 2219/1208* (2013.01); *G05B 2219/45135* (2013.01)

(58) Field of Classification Search
USPC ......... 219/130.21, 130.01, 130.1, 136, 130.5
See application file for complete search history.

(56) References Cited

U.S. PATENT DOCUMENTS

| | | | |
|---|---|---|---|
| 6,151,640 A * | 11/2000 | Buda | B23K 11/252 709/236 |
| 6,797,921 B1 | 9/2004 | Niedereder et al. | |
| 2004/0054439 A1* | 3/2004 | Morita | G05B 19/41815 700/245 |
| 2007/0007262 A1* | 1/2007 | Aimi | B23K 11/24 219/130.5 |
| 2009/0057286 A1* | 3/2009 | Ihara | B23K 9/0953 219/130.21 |
| 2014/0238965 A1 | 8/2014 | Spisic et al. | |

FOREIGN PATENT DOCUMENTS

| | | |
|---|---|---|
| JP | 63-180103 | 7/1988 |
| JP | 04-017977 | 1/1992 |
| JP | 08-267255 | 10/1996 |
| JP | 10-207513 | 8/1998 |
| JP | 10207513 A * | 8/1998 |
| JP | 10-271836 | 10/1998 |
| JP | 10271836 A * | 10/1998 |
| JP | 10-298623 | 11/1998 |
| JP | 11-104831 | 4/1999 |
| JP | 2002-258916 | 9/2002 |
| JP | 2004-90027 | 3/2004 |
| JP | 2004090027 A * | 3/2004 |
| JP | 3562202 | 8/2004 |
| JP | 2010-29876 | 2/2010 |
| JP | 5288541 | 9/2013 |
| WO | 99/37435 | 7/1999 |
| WO | 01/12374 | 2/2001 |
| WO | 02/058877 | 8/2002 |
| WO | 2008/033652 | 3/2008 |
| WO | 2013/006884 | 1/2013 |

OTHER PUBLICATIONS

Japanese Office Action dated Jun. 23, 2015 in Japanese Patent Application No. 2013-537388 with English translation.
Communication of a notice of opposition dated Oct. 11, 2017 in European Patent Application No. 12837993.0 (with English translation of foreign language opposition dated Oct. 4, 2017).
Operation Manual "Robot Interface DeviceNet DeviceNet Twin", Version 03 from 2005, article No. 42, 0410, 0635 (with English translation, cited in CA as document D9).
Version list of Operation Manual (with English translation, cited in CA as document D10 & corresponds to CB).
Shipping invoice, among other things, of Operation Manual (with English translation, cited in CA as document D11 & corresponds to CB).
Affidavit by Mr. Klaus Fritsch, Mr. Florian Trautmann and Mr. Andreas Murauer (with English translation, cited in CA as document D12).
Technical Documentation "DeviceNet—Coupler BK5200, BK5210, LC5200", Version 1.3 of Oct. 30, 2006 of the company Beckhoff (with English translation, cited in CA as document D13).
Front pages of further versions of the Operation Manual with article No. 42, 0410, 0635 from the version list (with English translation, cited in CA as document D14 & corresponds to CC).
English translation of the International Preliminary Report on Patentability dated Apr. 8, 2014 in International Application No. PCT/JP2012/005827 (cited in CA as document D15).
Summons to attend oral proceedings pursuant to Rule 115(1) EPC issued Aug. 22, 2018 in European Patent Application No. 12837993.0.

* cited by examiner

FIG. 2A

First memory region

Input channel memory region

| Input channel 1 | Input function 5 | 1 |
|---|---|---|
| Input channel 2 | Input function 6 | 0 |
| Input channel 3 | Input function 1 | 1 |
| Input channel 4 | Input function 2 | 0 |
| Input channel 5 | Input function 3 | 1 |
| Input channel 6 | Input function 7 | 1 |
| Input channel 7 | Input function 4 | 1 |
| Input channel 8 | Input function 8 | 1 |

Output channel memory region

| Output channel 1 | Output function 8 | 1 |
|---|---|---|
| Output channel 2 | Output function 7 | 1 |
| Output channel 3 | Output function 6 | 1 |
| Output channel 4 | Output function 5 | 1 |
| Output channel 5 | Output function 1 | 1 |
| Output channel 6 | Output function 2 | 1 |
| Output channel 7 | Output function 4 | 1 |
| Output channel 8 | Output function 3 | 1 |

FIG.2C

| Highest-order bit | | | | | | | Lowest-order bit |
|---|---|---|---|---|---|---|---|
| 0 | 0 | 0 | 0 | 0 | 0 | 0 | 1 |

FIG.2D

| Highest-order bit | | | | | | | Lowest-order bit |
|---|---|---|---|---|---|---|---|
| 0 | 0 | 0 | 1 | 0 | 0 | 0 | 0 |

FIG. 11

Logical table (1:input or ON 0:no input or OFF)

| Input channel 1 | Input channel 3 | Output function 1 | Output function 2 | Output channel 1 | Output channel 2 |
|---|---|---|---|---|---|
| 0 | 0 | 0 | 0 | 0 | 0 |
| 0 | 0 | 0 | 1 | 0 | 0 |
| 0 | 0 | 1 | 0 | 0 | 0 |
| 0 | 0 | 1 | 1 | 0 | 0 |
| 0 | 1 | 0 | 0 | 0 | 0 |
| 0 | 1 | 0 | 1 | 1 | 1 |
| 0 | 1 | 1 | 0 | 1 | 1 |
| 0 | 1 | 1 | 1 | 1 | 1 |
| 1 | 0 | 0 | 0 | 0 | 0 |
| 1 | 0 | 0 | 1 | 1 | 1 |
| 1 | 0 | 1 | 0 | 1 | 1 |
| 1 | 0 | 1 | 1 | 1 | 1 |
| 1 | 1 | 0 | 0 | 0 | 0 |
| 1 | 1 | 0 | 1 | 1 | 1 |
| 1 | 1 | 1 | 0 | 1 | 1 |
| 1 | 1 | 1 | 1 | 1 | 1 |

ELECTRIC EQUIPMENT SYSTEM

1. TECHNICAL FIELD

The present invention relates to an electric equipment system including an input/output device for inputting/outputting information and electric equipment such as a welding apparatus used in a connecting state to the input/output device.

2. BACKGROUND ART

In a welding apparatus as an example of conventional electric equipment, a dedicated input/output circuit performs the input from the outside of the welding apparatus or the output to the outside (for example, Unexamined Japanese Patent Publication No. H04-17977). The input/output function is restricted and has no flexibility, and addition or modification of a circuit is required in order to alter the function of the welding apparatus.

FIG. 12 shows a configuration example of conventional welding apparatuses. FIG. 12 describes only a section for receiving information from the outside, and omits a configuration such as a welding output section that is required for arc welding.

Hereinafter, the welding apparatus of FIG. 12 is described. Only the input operation is described and drawn.

As shown in FIG. 12, welding apparatus 101 includes sequence control circuit 103. An on-off signal of trigger switch 102 is input to sequence control circuit 103 via wire feeder 105 having wire feeding motor 106. Welding apparatus 101 thus recognizes the state of trigger switch 102. Generally, welding apparatus 101 includes several input sections for receiving such a signal or the like. Similarly, welding apparatus 101 includes several output sections for outputting a signal or the like. Sequence control circuit 103 controls the wire feeding motor of wire feeder 105 via wire-feed control circuit 104.

Each of the above-mentioned input sections is dedicated to each function. Signals from trigger switch 102, for example, are input to sequence control circuit 103. In other words, the signals are input to the other circuit only when the connection is changed.

When the welding apparatus is applied to a production line of a factory, it is required that various input signals are transmitted to the welding apparatus to control the operation. In order to make a worker in the outside know the operation of the welding apparatus, various signals need to be output from the welding apparatus to the outside.

However, the external input/output section of the conventional welding apparatus is formed of dedicated input/output circuits. A case where the indication of an input on-off signal is intended to be inverted is taken as an example. Each circuit is designed dedicatedly, so that the circuit is difficult to be modified. A new device for inverting the indication of the on-off signal needs to be disposed in the outside. Also for the output, each circuit is designed dedicatedly, so that a new device for inverting the indication of the on-off signal needs to be disposed in the outside.

Also when the phenomenon having occurred in the welding apparatus is intended to be obtained as a plurality of outputs, a new device needs to be disposed in the outside. Also when a plurality of phenomena having occurred in the outside is made to undergo a logical operation and the result of the logical operation is intended to be input as an input signal, a new device needs to be disposed in the outside or the wiring needs to be modified.

Therefore, whenever a production line is newly constructed or modified, a new device for external input/output needs to be introduced.

SUMMARY

The present invention provides an electric equipment system that does not require that a new device for external input/output is introduced whenever a production line is newly constructed or modified, and can establish complex input/output requirements in a production line.

In order to address the above-mentioned problem, the electric equipment system of the present invention includes an input/output device having a function of inputting and outputting information to an external device and electric equipment for communicating with the input/output device. This input/output device includes the following elements:

- a general-purpose input circuit section for inputting information from the external device;
- a general-purpose output circuit section for outputting information to the external device; and
- an input/output control section for communicating with at least one of the general-purpose input circuit section, the general-purpose output circuit section, and the electric equipment.

The electric equipment includes an input/output assignment storing section and an electric-equipment-side input/output control section. The input/output assignment storing section stores which input channel of the general-purpose input circuit section an input signal from the external device is assigned to, and which output channel of the general-purpose output circuit section an output signal to the external device is assigned to. The electric-equipment-side input/output control section operates a function of the electric equipment based on the signal transmitted from the input/output control section, or transmits, to the input/output control section, a signal indicating which channel of the general-purpose output circuit section an output signal from the electric equipment is output to. At least one of the input/output control section and the electric-equipment-side input/output control section communicates with an external controller. The electric equipment system of the present invention stores the information related to the assignment in the input/output assignment storing section using the external controller, or alters the information related to the assignment that is stored in the input/output assignment storing section using the external controller.

Thus, this configuration does not require that a new device for external input/output is introduced whenever a production line is newly constructed or modified, and can establish complex input/output requirements in a production line.

BRIEF DESCRIPTION OF DRAWINGS

FIG. 2A is a diagram showing an example of a first memory region in accordance with the first exemplary embodiment of the present invention.

FIG. 2C is a diagram showing an example of a data format in accordance with the first exemplary embodiment of the present invention.

FIG. 2D is a diagram showing another example of the data format in accordance with the first exemplary embodiment of the present invention.

FIG. 11 is a diagram showing an example of a logical table during execution of the logical expression in accordance with the third exemplary embodiment of the present invention.

DESCRIPTION OF EMBODIMENTS

Exemplary embodiments of the present invention will be described hereinafter with reference to the accompanying drawings. In the accompanying drawings, the same elements are denoted with the same reference marks, and the descriptions of those elements are omitted.

First Exemplary Embodiment

Figure 1:
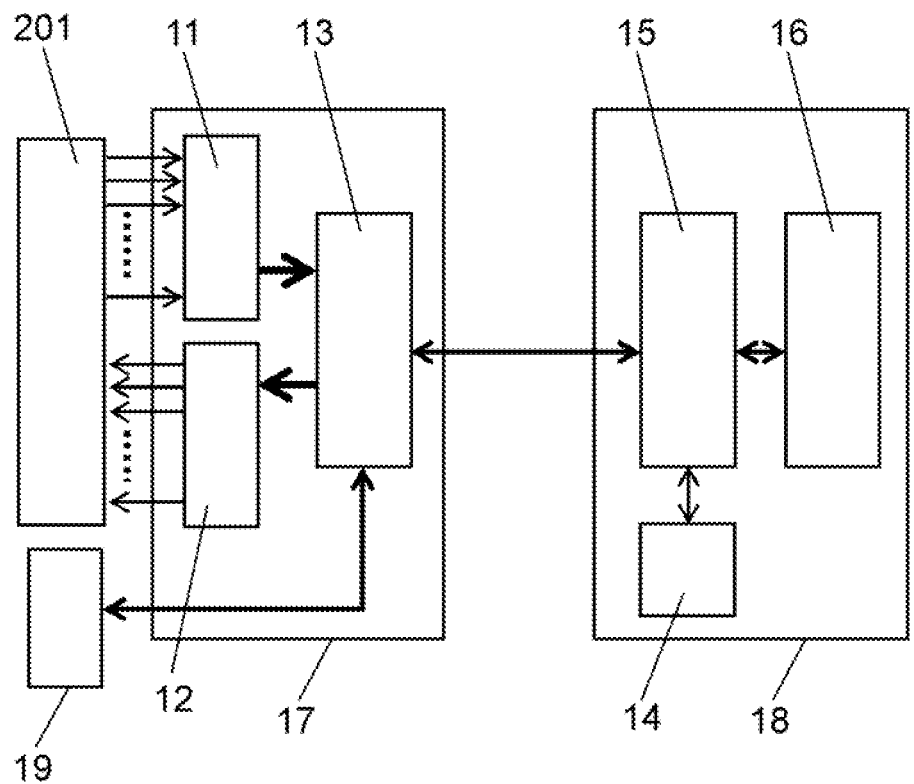
FIG. 1 is a schematic block diagram of an essential part of a welding system including an input/output device and welding apparatus in accordance with a first exemplary embodiment of the present invention.
Figure 2B:
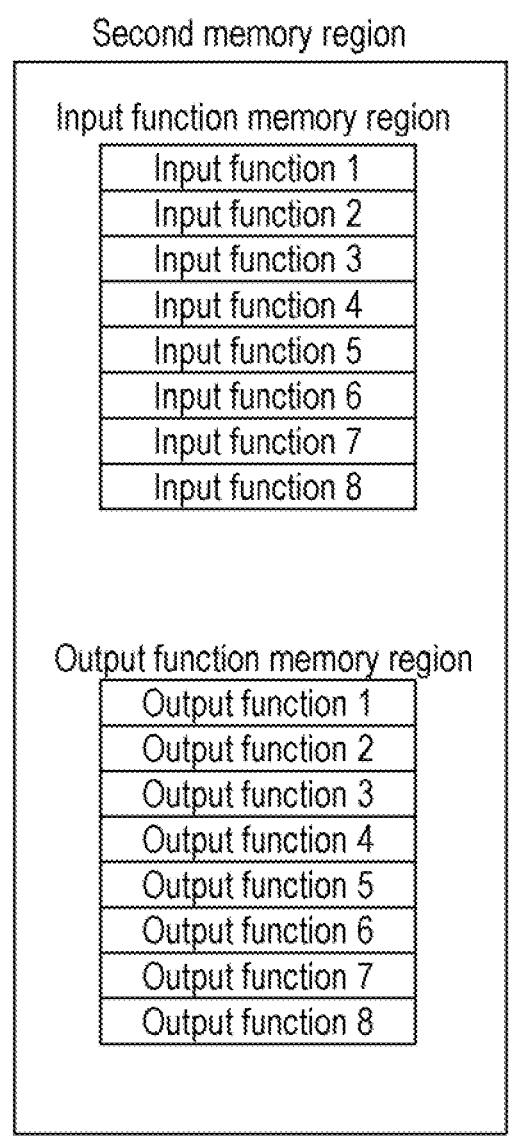
FIG. 2B is a diagram showing an example of a second memory region in accordance with the first exemplary embodiment of the present invention.
Figure 3:
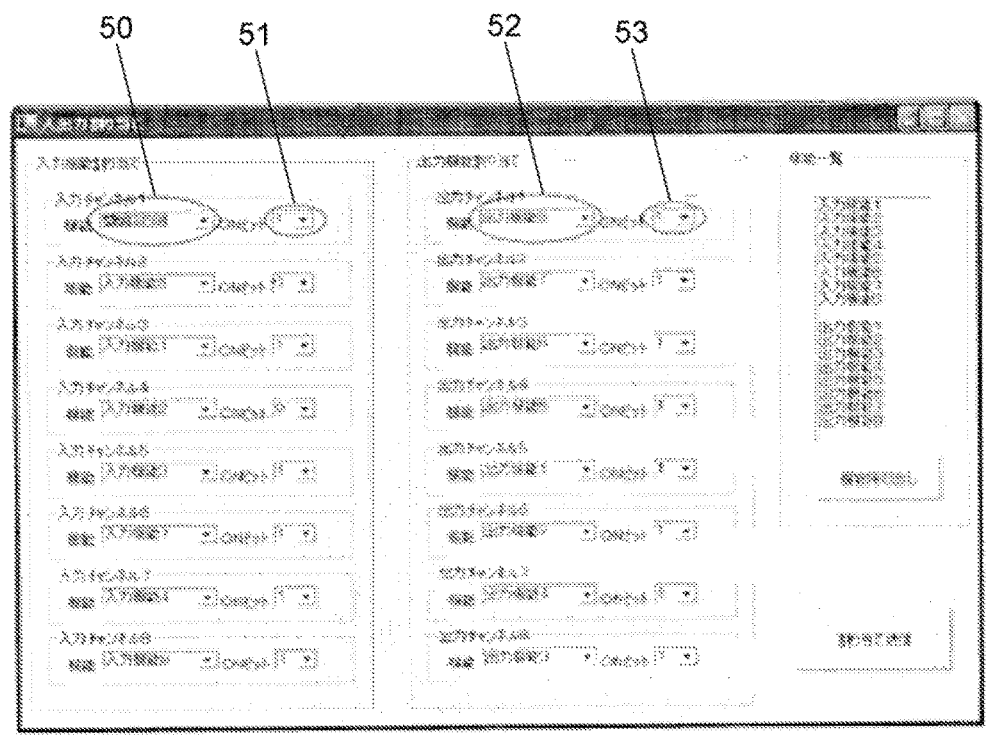
FIG. 3 is a diagram showing an example of an operation screen of a personal computer for assigning the input and output in accordance with the first exemplary embodiment of the present invention.

An electric equipment system of a first exemplary embodiment is described with reference to FIG. 1 through FIG. 3. As an example of the electric equipment system of a first exemplary embodiment, a welding apparatus is described. FIG. 1 is a schematic block diagram of an essential part of a welding system including an input/output device and welding apparatus in accordance with the first exemplary embodiment of the present invention. Each of FIG. 2A, FIG. 2B, FIG. 2C, and FIG. 2D is a diagram showing a memory region or a data format of storing section in accordance with the first exemplary embodiment of the present invention. FIG. 3 is a diagram showing an example of an operation screen of a personal computer (hereinafter referred to as "PC") for assigning the input and output in accordance with the first exemplary embodiment of the present invention.

As shown in FIG. 1, welding apparatus 18 as electric equipment is communicably connected to input/output device 17. Input/output device 17 has a function of inputting or outputting information to an external device 201, and is communicably connected to welding apparatus 18 and PC 19. Input/output device 17 includes general-purpose input circuit section 11, general-purpose output circuit section 12, and input/output control section 13. General-purpose input circuit section 11 receives a plurality of input signals from a device or the like outside input/output device 17. General-purpose output circuit section 12 outputs a plurality of output signals to a device or the like outside input/output device 17. Input/output control section 13 receives the input signals from general-purpose input circuit section 11, outputs the output signals to general-purpose output circuit section 12, and digitally communicates with PC 19 and welding apparatus 18.

Welding apparatus 18 includes input/output assignment storing section 14, welding-apparatus-side input/output control section 15, and body control section 16. Input/output assignment storing section 14 stores an input/output assignment state (described later in detail). Welding-apparatus-side input/output control section 15 sends data to body control section 16 at the input time and sends data to input/output control section 13 at the output time, based on the input data sent from input/output control section 13 of input/output device 17 or the output data sent from body control section 16 of welding apparatus 18, and the data stored in input/output assignment storing section 14. Body control section 16 controls the operation sequence of welding apparatus 18. Body control section 16 alters the operation sequence based on the input data sent from welding-apparatus-side input/output control section 15, or sends data to welding-apparatus-side input/output control section 15 as necessary.

Input/output device 17 includes general-purpose input circuit section 11, general-purpose output circuit section 12, and input/output control section 13. Welding apparatus 18 includes input/output assignment storing section 14, welding-apparatus-side input/output control section 15, body control section 16, and a welding output section (not shown). FIG. 1 omits the description of the welding output section or the like, which is not directly related to the present invention.

The operation of the welding system including input/output device 17 and welding apparatus 18 in the above-mentioned configuration is described.

First, using a device such as PC 19 where digital communication is allowed and predetermined software is operable, input and output are assigned. As shown in FIG. 2B, input/output functions of welding apparatus 18 are previously stored in numerical sequence in the second memory region of input/output assignment storing section 14 of welding apparatus 18. In response to a function call from PC 19, the contents in the second memory region are transmitted to PC 19 via welding-apparatus-side input/output control section 15 of welding apparatus 18 and input/output control section 13 of input/output device 17.

PC 19 displays the image shown in FIG. 3 on the screen based on a program stored and executed in PC 19. In PC 19, by operation on the screen, an input function and output function are assigned to each channel of general-purpose input circuit section 11 and each channel of general-purpose output circuit section 12. It is determined whether the value of the bit at the input/output time is set to low active (a value of "0") or high active (a value of "1").

An example of the input functions is to inspect gas output used for welding or to start the welding with a torch switch for performing welding output. An example of the output functions is to detect and output the welding output current, or to detect a trouble of welding apparatus 18 and inform the outside of the trouble. As shown in FIG. 3, selecting section 50 selects an input function to be assigned. Selecting section 51 selects a value of a bit at the input time. Selecting section 52 selects an output function to be assigned. Selecting section 53 selects a value out of values which can be taken by a bit which indicates the output time.

The data after the assignment and setting has a format of FIG. 2A, for example. This data is transmitted from PC 19 to input/output assignment storing section 14 of welding apparatus 18 via input/output control section 13 of input/output device 17 and welding-apparatus-side input/output control section 15 of welding apparatus 18. This data is then stored in the first memory region of input/output assignment storing section 14. In the first memory region, the function of each channel and the bit (a value out of values "1" and "0" of the bit indicates that each channel is at the input/output time) indicating that the input/output channel is at the input/output time are stored in the same format as that in FIG. 2A. In a specific example, input function 5 is assigned to input channel 1 and a value of "1" of the bit at the input/output time is set in it.

In the assignment in FIG. 2A, when a signal is input to input channel 1 of general-purpose input circuit section 11, the signal is sent to input/output control section 13 via general-purpose input circuit section 11. Input/output control section 13 converts the signal into the data format of FIG. 2C. The obtained data is sent to welding-apparatus-side input/output control section 15 of welding apparatus 18 by digital communication.

In the format of FIG. 2C, the data is represented by 0 and 1 in binary notation, and one input circuit of general-purpose input circuit section 11 corresponds to one-bit data. When there are eight input circuits, data is represented as an eight-bit data string of FIG. 2C. In the data string, the left end is set as the highest-order bit, the right end is set as the lowest-order bit, and input channels 1, 2, 3, . . . , 8 are set sequentially from the lowest order.

Welding-apparatus-side input/output control section 15 refers to the sent data and the input channel memory region of the first memory region of input/output assignment storing section 14, and sends a matched function to body control section 16. Body control section 16 operates the function sent from welding-apparatus-side input/output control section 15. FIG. 2A and FIG. 2C are hereinafter described as an example. When the data of FIG. 2C is compared with the input channels in the input channel memory region of FIG. 2A, the bit value corresponding to input channel 1 is "1", and the bit values corresponding to input channel 2 and input channel 4 are "0". Thus, there is an input in input channel 1, input channel 2, and input channel 4. Therefore, welding-apparatus-side input/output control section 15 sends input function 5, input function 6, and input function 2 to body control section 16, and body control section 16 operates input function 5, input function 6, and input function 2.

The case where body control section 16 of welding apparatus 18 outputs input function 1 is described. Body control section 16 sends the fact that input function 1 is operating to welding-apparatus-side input/output control section 15. Welding-apparatus-side input/output control section 15 refers to the output channel memory region of the first memory region of input/output assignment storing section 14, and determines which output channel input function 1 is assigned to. Welding-apparatus-side input/output control section 15 creates data having the data format shown in FIG. 2D, and sends the data to input/output control section 13 of input/output device 17. Input/output control section 13 performs an output to a specified channel of general-purpose output circuit section 12 based on the sent data.

The data in FIG. 2D is represented by 0 and 1 in binary notation, one output circuit of general-purpose output circuit section 12 corresponds to one-bit data. When there are eight output circuits, data is represented as an eight-bit data string. In the data string, the left end is set as the highest-order bit, the right end is set as the lowest-order bit, and output channels 1, 2, 3, . . . , 8 are set sequentially from the lowest order.

FIG. 2A and FIG. 2D are hereinafter described as an example. When sent output function 1 is compared with the output channels in the output channel memory region of FIG. 2A, output function 1 corresponds to output channel 5. Therefore, welding-apparatus-side input/output control section 15 creates data having the data format shown in FIG. 2D, and sends the data to input/output control section 13. Input/output control section 13 performs an output to channel 5 of general-purpose output circuit section 12 based on the sent data.

As discussed above, the electric equipment (here, welding apparatus 18) of the first exemplary embodiment includes input/output assignment storing section 14 and welding-apparatus-side input/output control section 15. Input/output assignment storing section 14 stores which input channel of general-purpose input circuit section 11 an input signal from the external device 201 is assigned to, and which output channel of general-purpose output circuit section 12 an output signal to the external device 201 is assigned to. Welding-apparatus-side input/output control section 15 operates a function of the electric equipment based on the signal sent from input/output control section 13, or sends, to input/output control section 13, a signal indicating which channel of general-purpose output circuit section 12 an output signal from the electric equipment is output to. At least one of input/output control section 13 and welding-apparatus-side input/output control section 15 communicates with an external controller. The electric equipment system of the first exemplary embodiment then stores the information related to the assignment in input/output assignment storing section 14 using the external controller, or alters the information related to the assignment that is stored in input/output assignment storing section 14 using the external controller.

Thus, this configuration allows the input and output of information to the outside to be set without restraint. Therefore, this configuration does not require that a new device for external input/output is introduced whenever a production line is newly constructed or modified, and can establish complex input/output requirements in a production line.

Figure 4:
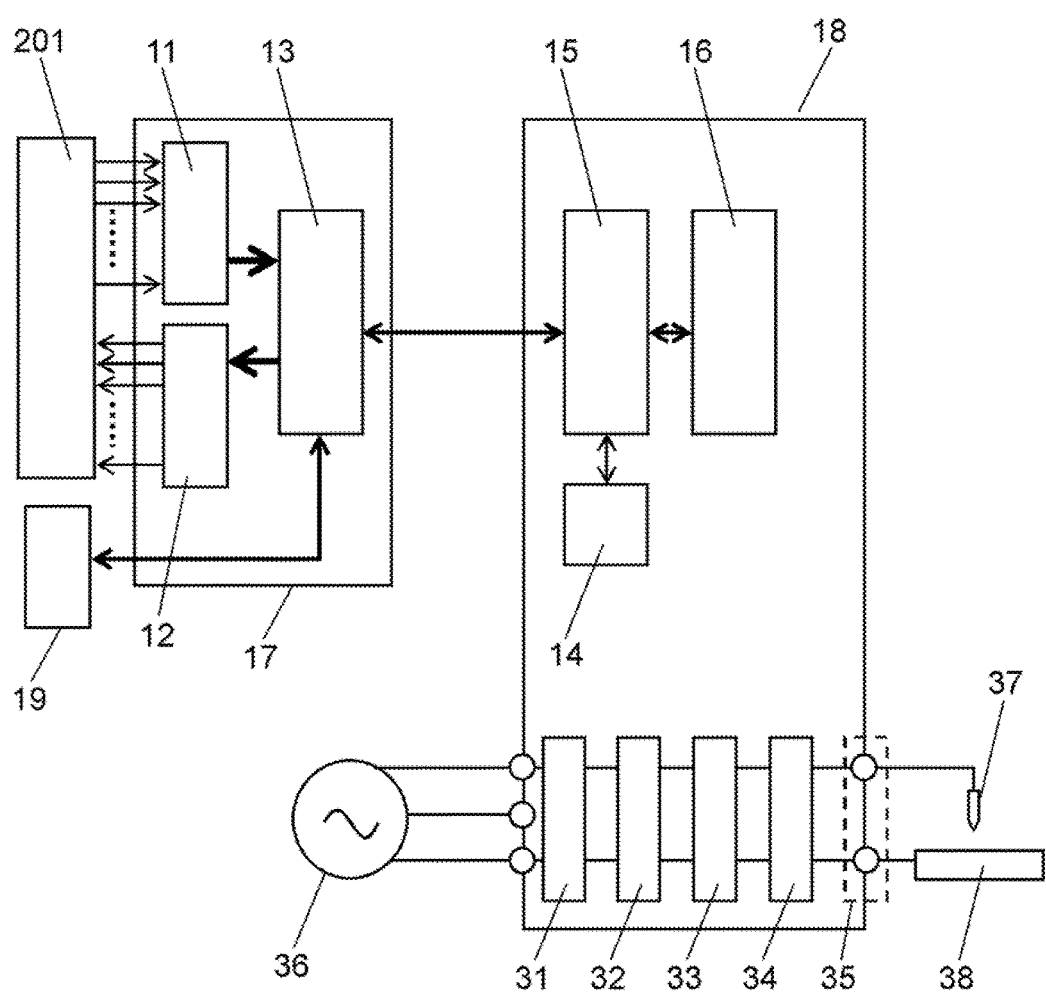
FIG. 4 is a schematic block diagram of an essential part of another welding system including the input/output device and welding apparatus in accordance with the first exemplary embodiment of the present invention.

FIG. 4 is a schematic block diagram of an essential part of another welding system including input/output device 17 and welding apparatus 18 in accordance with the first exemplary embodiment of the present invention. Another electric equipment system (welding system) of the first exemplary embodiment is described using FIG. 4.

In the electric equipment system of the first exemplary embodiment of FIG. 4, welding apparatus 18 as electric equipment includes first rectifying section 31, inverter 32, transformer 33, second rectifying section 34, and output terminal 35. The external controller may be a personal computer (e.g. PC 19) for communicating with the electric equipment via input/output device 17. First rectifying section 31 rectifies the alternating current (AC) voltage that has been input from AC source 36. Inverter 32 converts the output of first rectifying section 31 into a high frequency wave. Transformer 33 varies the voltage of the output of inverter 32. Second rectifying section 34 rectifies the output of transformer 33. Output terminal 35 outputs the output of second rectifying section 34 to between electrode 37 for welding and welding object 38.

Thus, this configuration allows the input and output of information to the outside to be set without restraint by an electric operation. Therefore, this configuration does not require that a new device for external input/output is introduced whenever a production line is newly constructed or modified, and can establish complex input/output requirements in a production line.

Second Exemplary Embodiment

Figure 5:
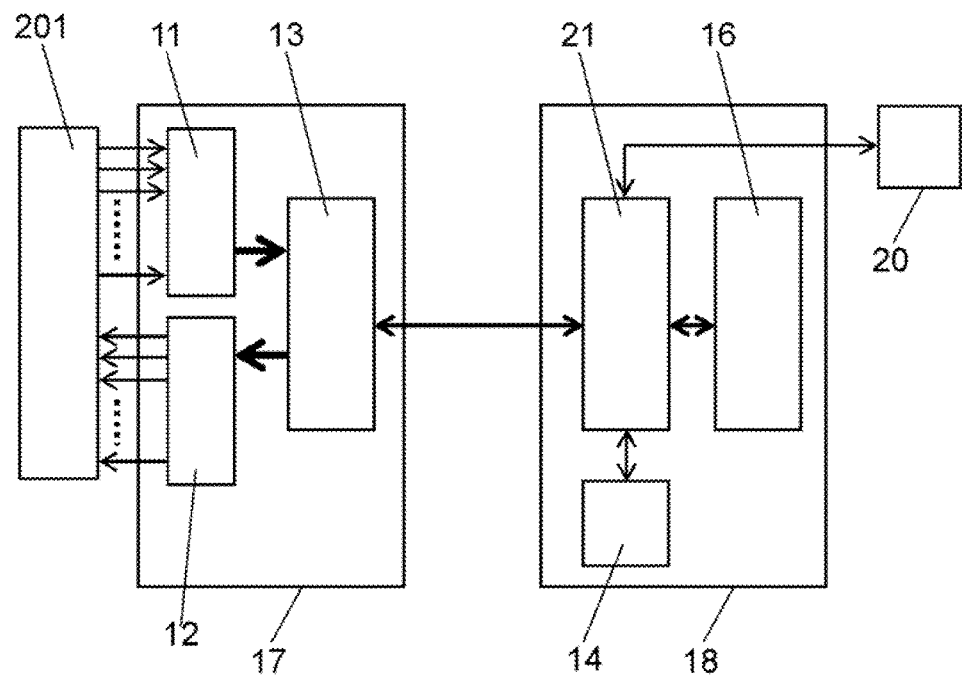
FIG. 5 is a schematic block diagram of an essential part of a welding system including an input/output device and welding apparatus in accordance with a second exemplary embodiment of the present invention.

A second exemplary embodiment of the present invention is described with reference to FIG. 5, FIG. 6A, FIG. 6B, and FIG. 6C. FIG. 5 is a schematic block diagram of an essential part of a welding system including an input/output device and welding apparatus in accordance with a second exemplary embodiment of the present invention. Each of FIG. 6A, FIG. 6B, and FIG. 6C is a diagram showing an example of the outline and operation screen of a controller in accordance with the second exemplary embodiment.

The second exemplary embodiment differs from the first exemplary embodiment in the configuration of welding apparatus 18. Welding apparatus of the second exemplary embodiment does not include welding-apparatus-side input/output control section 15 of FIG. 1, but includes welding-apparatus-side input/output control section 21 of controller connection type as shown in FIG. 5. Controller 20 assigns the input and output.

As shown in FIG. 5, controller 20 includes several switches, dials, and indicators, for example, and has a function of indicating, to welding apparatus 18, welding command current, welding command voltage, and welding condition. The assignment of the input and output can be instructed using the dials and indicators of controller 20.

Figure 6A:
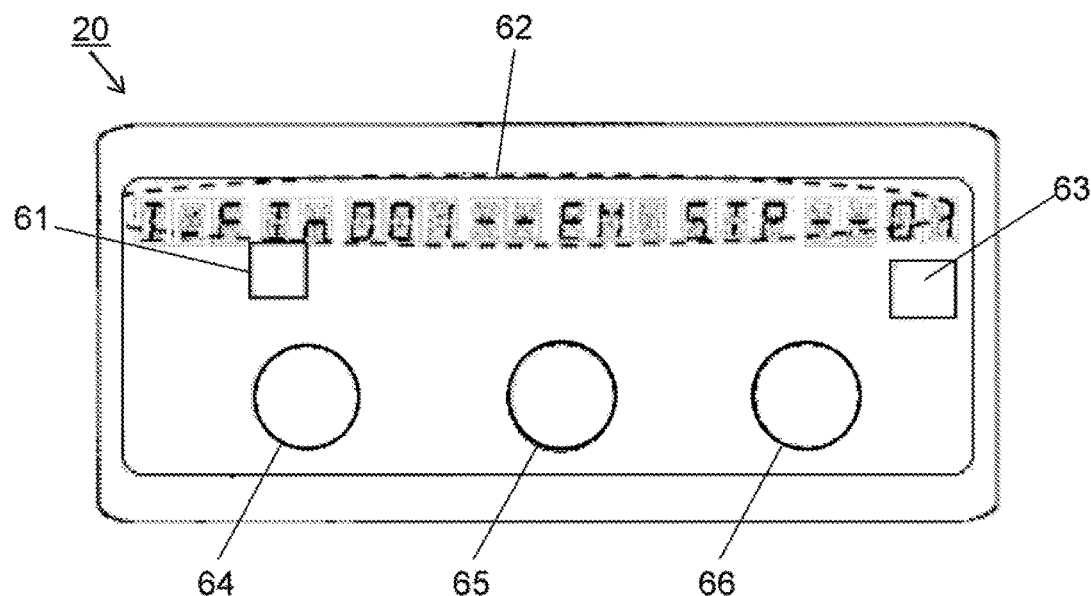
FIG. 6A is a diagram showing an example of the outline and operation screen of a controller in accordance with the second exemplary embodiment of the present invention.
Figure 6B:
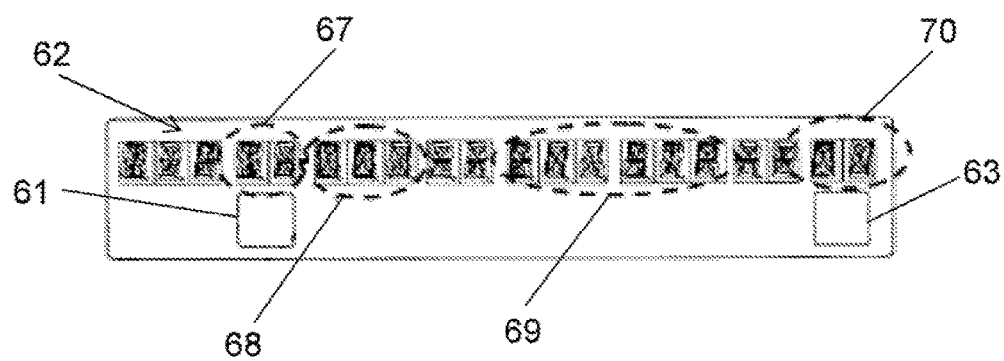
FIG. 6B is a diagram showing an example of the operation screen of the controller in accordance with the second exemplary embodiment of the present invention.
Figure 6C:
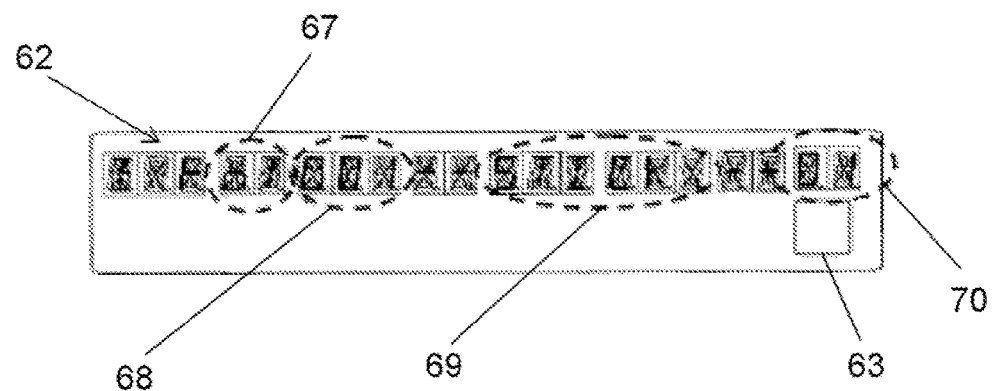
FIG. 6C is a diagram showing an example of the operation screen of the controller in accordance with the second exemplary embodiment of the present invention.

FIG. 6A schematically shows an operating section of controller 20. The description of a part that is not related to the present invention is omitted. Welding-apparatus-side input/output control section 21 of controller connection type has a function of creating the assignment table of FIG. 2A in response to the instruction from controller 20.

The operation of the welding system including input/output device 17 and welding apparatus 18 in the above-mentioned configuration is described.

An example where the input and output are assigned in response to the instruction from controller 20 is described. Whenever first switch 61 of controller 20 of FIG. 6A is pushed, the data is transmitted from controller 20 to welding-apparatus-side input/output control section 21 of controller connection type of welding apparatus 18. Welding-apparatus-side input/output control section 21 switches between input channel assignment and output channel assignment based on the data from controller 20. The switched data is transmitted to controller 20. Controller 20 displays the data on indicator 62. By switching between input channel assignment and output channel assignment, welding-apparatus-side input/output control section 21 determines whether the target of the first memory region is the input channel memory region or output channel memory region. Similarly, welding-apparatus-side input/output control section 21 determines whether the target of the second memory region is the input function memory region or output function memory region. Controller 20 of FIG. 6A includes second switch 63, first dial 64, second dial 65, and third dial 66.

Next, the specific assignment of the input/output channels and input/output operation are described.

Regarding the input channel assignment, as shown in FIG. 6B, controller 20 displays, on indicator 62, the channel number, the input function, and the bit at the input time that have been sent from welding-apparatus-side input/output control section 21. Second dial 65 is of click type. Whenever the dial is turned by one click, data that indicates whether the dial has been turned clockwise or counterclockwise is sent to welding-apparatus-side input/output control section 21. Welding-apparatus-side input/output control section 21 increases or decreases the stored memory address, sequentially extracts the input functions in the input function memory region of the second memory region, and transmits the input functions to controller 20. Controller 20 displays the transmitted input functions on indicator 62.

At this time, welding-apparatus-side input/output control section 21 stores the currently extracted input function. An input channel to which the input function is intended to be assigned is selected using first dial 64. First dial 64 is of click type. Whenever the dial is turned by one click, data that indicates whether the dial has been turned clockwise or counterclockwise is sent to welding-apparatus-side input/output control section 21. Welding-apparatus-side input/output control section 21 increases or decreases the stored channel number, and transmits the current channel number to controller 20. Controller 20 displays the transmitted channel number on indicator 62.

Using third dial 66, a bit (which one of "1" or "0" indicates whether the input channel is at the input time or not) indicating that the input channel is at the input time is selected. Third dial 66 is of click type. Whenever the dial is turned by one click, data that indicates whether the dial has been turned clockwise or counterclockwise is sent to welding-apparatus-side input/output control section 21. Welding-apparatus-side input/output control section 21 sets the stored bit data at 0 or 1, and transmits the current bit data to controller 20. Controller 20 displays the transmitted bit data on indicator 62. When the input channel number intended to be assigned, the input function, and the bit at the input time are determined, second switch 63 is pushed.

In indicator 62 of FIG. 6B and FIG. 6C, display section 67 shows that an input channel or output channel is assigned. Display section 67 shows that pushing first switch 61 switches the assignment between the input channel and output channel. Display section 68 shows that the input port number or output port number is changed with first dial 64. Display section 68 shows that the input port number or output port number is decreased when first dial 64 is turned counterclockwise, and the input port number or output port number is increased when first dial 64 is turned clockwise (up to eight channels).

The input display function or output display function of the welding apparatus is sequentially changed with second dial 65, and display section 69 shows the changed function. Display section 69 shows the function corresponding to the number. In the other words, the number is decreased when second dial 65 is turned counterclockwise, and the number is increased when second dial 65 is turned clockwise. Display section 70 shows that the bit at the input time is changed with third dial 66. Display section 70 shows 0 when third dial 66 is turned counterclockwise or shows 1 when third dial 66 is turned clockwise. When second switch 63 is pushed, a function is set.

Controller 20 transmits the fact that second switch 63 has been pushed to welding-apparatus-side input/output control section 21. Welding-apparatus-side input/output control section 21 sends the currently stored input channel number, input function, and a value of the bit at the input time to input/output assignment storing section 14. The input function and the value of the bit at the input time are stored in the place matching with the input channel in the input channel memory region shown by FIG. 2A of input/output assignment storing section 14. By performing this operation for each channel, the input function and the value of the bit at the input time of each channel are set.

The input operation is described. In the assignment of FIG. 2A, when a signal is input to input channel 1, the signal is sent to input/output control section 13 via general-purpose input circuit section 11. Input/output control section 13 converts the signal into the data format of FIG. 2C. The obtained data is sent to welding-apparatus-side input/output control section 21 by digital communication.

In the format of FIG. 2C, the data is represented by 0 and 1 in binary notation, and one input circuit of general-purpose input circuit section 11 corresponds to one-bit data. When there are eight input circuits, data is represented as an eight-bit data string. In the data string, the left end is set as the highest-order bit, the right end is set as the lowest-order bit, and input channels 1, 2, 3, . . . , 8 are set sequentially from the lowest order.

Welding-apparatus-side input/output control section 21 refers to the sent data and the input channel memory region of the first memory region, and sends the matched function to body control section 16. Body control section 16 operates the function sent from welding-apparatus-side input/output control section 21. FIG. 2A and FIG. 2C are hereinafter described. When the data of FIG. 2C is compared with the input channels in the input channel memory region of FIG. 2A, it is found that there is an input in input channel 1, input channel 2, and input channel 4. Therefore, welding-apparatus-side input/output control section 21 sends input function 5, input function 6, and input function 2 to body control section 16, and body control section 16 operates input function 5, input function 6, and input function 2.

Regarding the output channel assignment, as shown in FIG. 6C, controller 20 displays, on indicator 62, the channel number, the output function, and the bit at the output time that have been sent from welding-apparatus-side input/output control section 21. Second dial 65 is of click type. Whenever the dial is turned by one click, data that indicates whether the dial has been turned clockwise or counterclockwise is sent to welding-apparatus-side input/output control section 21. Welding-apparatus-side input/output control section 21 increases or decreases the stored memory address, sequentially extracts the output functions in the output function memory region of memory region 2, and transmits the output functions to controller 20. Controller 20 displays the transmitted output functions on indicator 62. At this time, welding-apparatus-side input/output control section 21 stores the currently extracted output function.

Using first dial 64, an output channel to which the output function is intended to be assigned is selected. First dial 64 is of click type. Whenever the dial is turned by one click, data that indicates whether the dial has been turned clockwise or counterclockwise is sent to welding-apparatus-side input/output control section 21. Welding-apparatus-side input/output control section 21 increases or decreases the stored channel number, and transmits the current channel number to controller 20. Controller 20 displays the transmitted channel number on indicator 62.

Using third dial 66, a bit (a value out of values "1" and "0" of the bit indicates the output time) indicating that the output channel is at the output time is selected. Third dial 66 is of click type. Whenever the dial is turned by one click, data that indicates whether the dial has been turned clockwise or counterclockwise is sent to welding-apparatus-side input/output control section 21. Welding-apparatus-side input/output control section 21 sets the stored value "0" or "1" of the bit, and transmits the current value of the bit to controller 20. Controller 20 displays the transmitted the value of the bit on indicator 62.

When the output channel number intended to be assigned, the output function, and the value of the bit at the output time are determined, second switch 63 is pushed. Controller 20 transmits the fact that second switch 63 has been pushed to welding-apparatus-side input/output control section 21. Welding-apparatus-side input/output control section 21 sends the currently stored output channel number, output function, and the value of the bit at the output time to input/output assignment storing section 14. The output function and the value of the bit at the output time are stored in the place matching with the output channel in the output channel memory region shown by FIG. 2A of input/output assignment storing section 14. By performing this operation for each channel, the output function and the value of the bit at the output time of each channel are set.

As the output operation, the case where body control section 16 outputs output function 1 is described. Body control section 16 sends the fact that output function 1 is operating to welding-apparatus-side input/output control section 21. Welding-apparatus-side input/output control section 21 refers to the output channel memory region of the first memory region of input/output assignment storing section 14, and determines which output channel output function 1 is assigned to. Welding-apparatus-side input/output control section 21 creates data having the data format shown in FIG. 2D, and sends the data to input/output control section 13. Input/output control section 13 performs an output to the specified channel of general-purpose output circuit section 12 based on the sent data.

The data in FIG. 2D is represented by 0 and 1 in binary notation, one output circuit of general-purpose output circuit section 12 corresponds to one-bit data. When there are eight output circuits, data is represented as an eight-bit data string. In the data string, the left end is set as the highest-order bit, the right end is set as the lowest-order bit, and output channels 1, 2, 3, . . . , 8 are set sequentially from the lowest order.

FIG. 2A and FIG. 2D are hereinafter described. When sent output function 1 is compared with the output channels in the output channel memory region of FIG. 2A, output function 1 corresponds to output channel 5. Therefore, welding-apparatus-side input/output control section 21 creates data having the format shown in FIG. 2D, and sends the data to input/output control section 13. Input/output control section 13 performs an output to channel 5 of general-purpose output circuit section 12 based on the sent data.

As discussed above, the welding system of the second exemplary embodiment allows input and output of information to the outside to be set without restraint. Therefore, this system does not require that a new device for external input/output is introduced whenever a production line is newly constructed or modified, and can establish complex input/output requirements in a production line.

Figure 7:
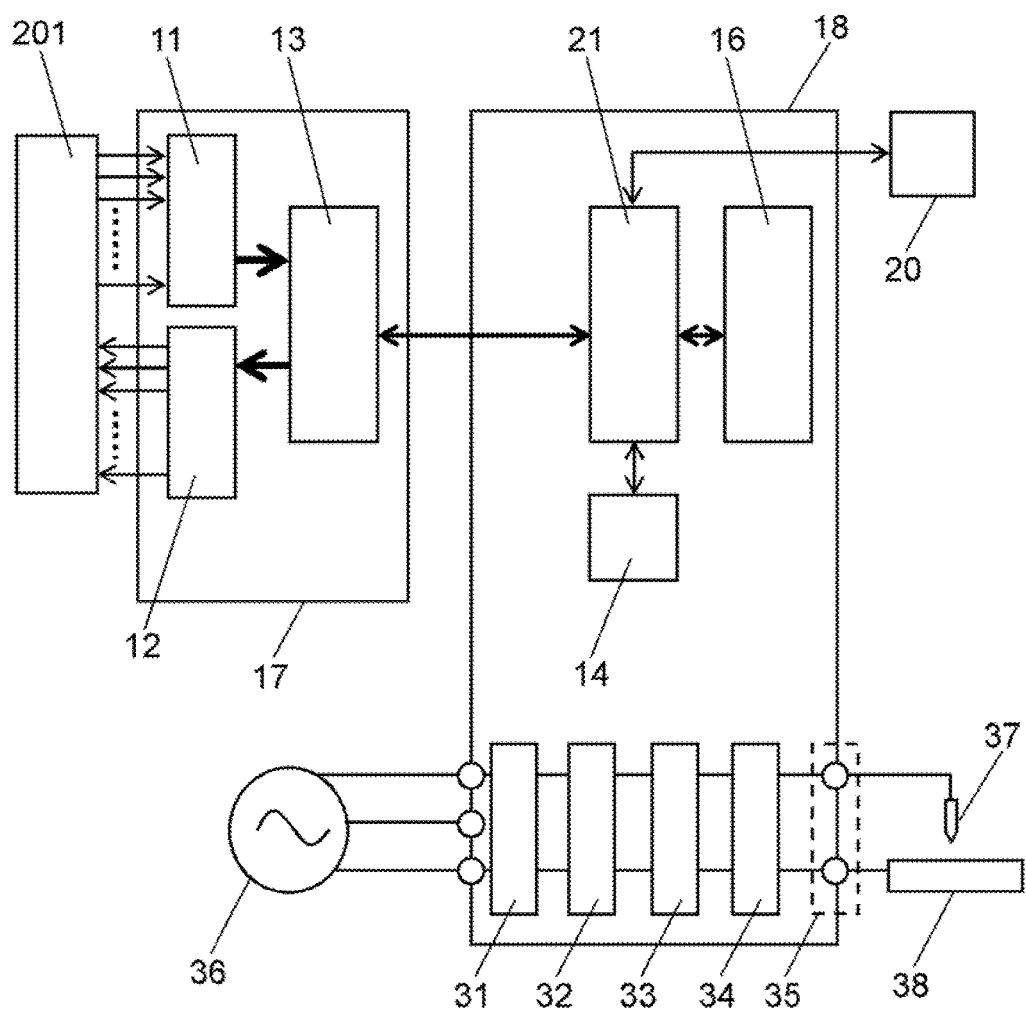
FIG. 7 is a schematic block diagram of an essential part of another welding system including the input/output device and welding apparatus in accordance with the second exemplary embodiment of the present invention.

FIG. 7 is a schematic block diagram of an essential part of another welding system including input/output device 17 and welding apparatus 18 in accordance with the second exemplary embodiment of the present invention. Another electric equipment system (welding system) of the second exemplary embodiment is described using FIG. 7.

In the electric equipment system of the second exemplary embodiment of FIG. 7, welding apparatus 18 as electric equipment includes first rectifying section 31, inverter 32, transformer 33, second rectifying section 34, and output terminal 35. The external controller may be a setting device (e.g. controller 20) for setting a welding condition for the electric equipment (here, welding apparatus 18). First rectifying section 31 rectifies the AC voltage that has been input from AC source 36. Inverter 32 converts the output of first rectifying section 31 into a high frequency wave. Transformer 33 varies the voltage of the output of inverter 32. Second rectifying section 34 rectifies the output of transformer 33. Output terminal 35 outputs the output of second rectifying section 34 to between electrode 37 for welding and welding object 38.

Thus, this configuration allows the input and output of information to the outside to be set without restraint by an electric operation. Therefore, this configuration does not require that a new device for external input/output is introduced whenever a production line is newly constructed or modified, and can establish complex input/output requirements in a production line.

Third Exemplary Embodiment

Figure 8:
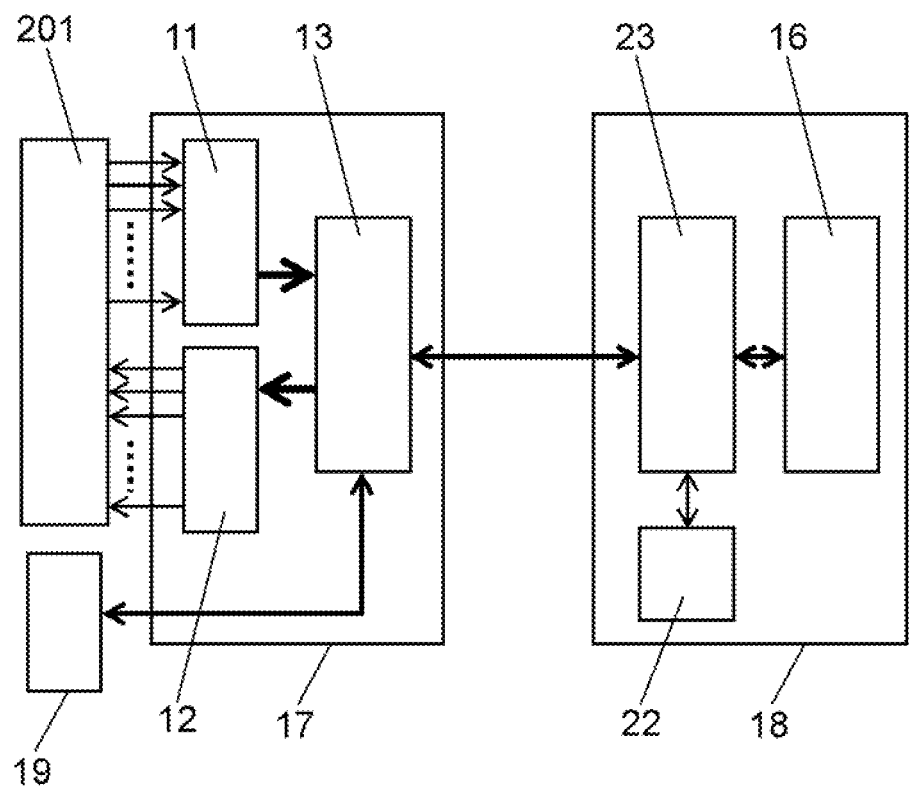
FIG. 8 is a schematic block diagram of an essential part of a welding system including an input/output device and welding apparatus in accordance with a third exemplary embodiment of the present invention.
Figure 9:
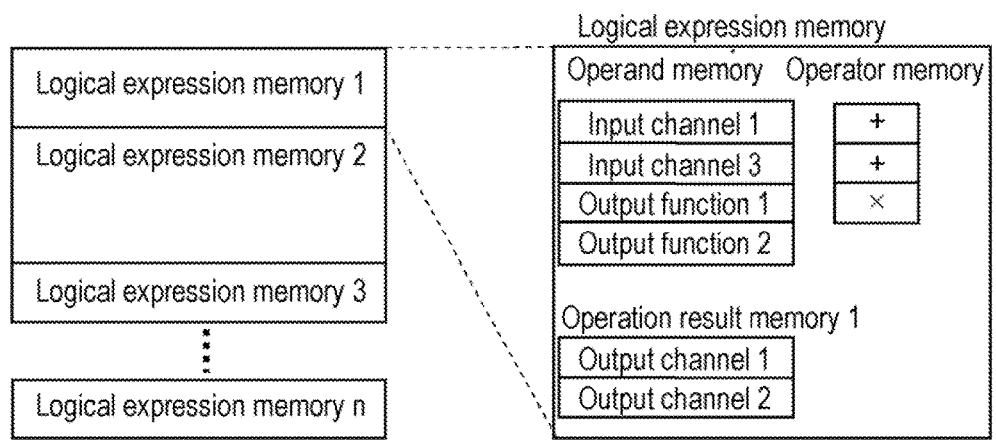
FIG. 9 is a diagram showing an example of a logical expression memory in accordance with the third exemplary embodiment of the present invention.
Figure 10:
FIG. 10 is a diagram showing an example of an operation screen of a personal computer for assigning the input and output and inputting a logical expression in accordance with the third exemplary embodiment of the present invention.
Figure 12:
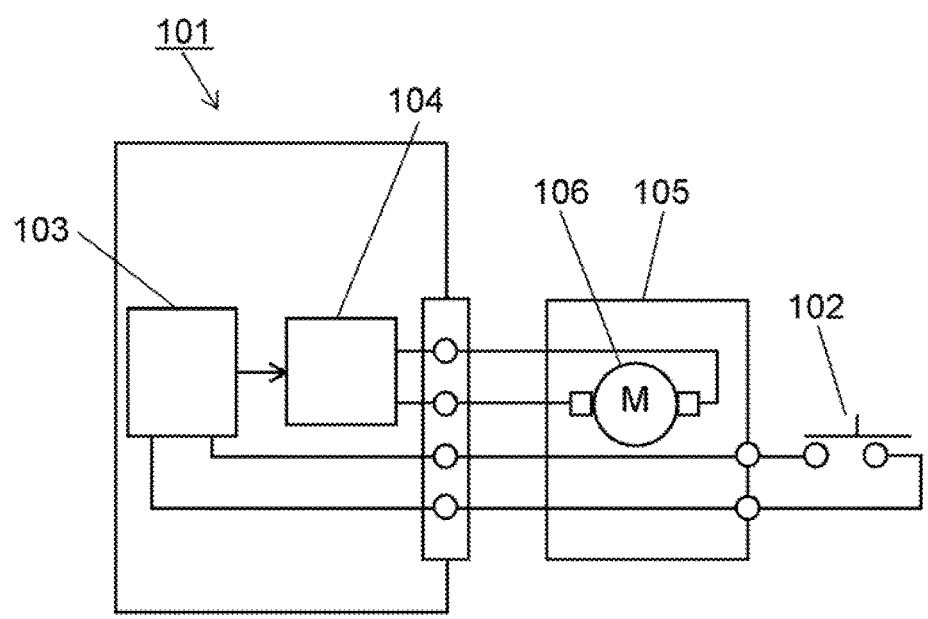
FIG. 12 is a block diagram showing an outline of a conventional welding apparatus.

A third exemplary embodiment of the present invention is described with reference to FIG. 8 through FIG. 11. FIG. 8 is a schematic block diagram of an essential part of a welding system including an input/output device and welding apparatus in accordance with the third exemplary embodiment of the present invention. FIG. 9 is a diagram showing an example of a logical expression memory in accordance with the third exemplary embodiment of the present invention. FIG. 10 is a diagram showing an example of an operation screen of a PC for assigning the input and output and inputting a logical expression in accordance with the third exemplary embodiment of the present invention. FIG. 11 is a diagram showing an example during execution of the logical expression in accordance with the third exemplary embodiment of the present invention.

The electric equipment system of the third exemplary embodiment differs from that of the first exemplary embodiment in that the electric equipment system of the third exemplary embodiment further performs a logical expression operation. For this purpose, input/output assignment storing section 22 of logical expression type shown in FIG. 8 is disposed instead of input/output assignment storing section 14 of FIG. 1, and welding-apparatus-side input/output control section 23 of logical expression type shown in FIG. 8 is disposed instead of welding-apparatus-side input/output control section 15 of FIG. 1.

As shown in FIG. 8, input/output assignment storing section 22 of logical expression type of welding apparatus 18 stores an input/output assignment state and the logical expression of each channel and function. Welding-apparatus-side input/output control section 23 of logical expression type performs an operation based on the input data sent from input/output control section 13 of input/output device 17 or the output data sent from body control section 16 of welding apparatus 18, and the data and logical expression stored in input/output assignment storing section 22 of logical expression type. Welding-apparatus-side input/output control section 23 of logical expression type sends the operation result data to body control section 16 or input/output control section 13.

In the third exemplary embodiment, the description of a welding output section or the like that is not directly related to the present invention is omitted.

The operation of the welding system including input/output device 17 and welding apparatus 18 in the above-mentioned configurations is described.

First, using a device such as PC 19 where digital communication is allowed and predetermined software is operable, input and output are assigned. As shown in FIG. 2B, the input/output functions of welding apparatus 18 are previously stored in numerical sequence in the second memory region of input/output assignment storing section 22 of logical expression type shown in FIG. 9. In response to a function call from PC 19, therefore, the contents in the second memory region of input/output assignment storing section 22 of logical expression type are transmitted to PC 19 via welding-apparatus-side input/output control section 23 of logical expression type and input/output control section 13.

In response to the operation on the screen shown in FIG. 10, PC 19 assigns an input function and output function to each channel, and determines whether the value of the bit at the input/output time is set to low active (a value of "0") or high active (a value of "1"). The data after the assignment and setting has a format of FIG. 2A, for example. This data is transmitted from PC 19 to input/output assignment storing section 22 of logical expression type via input/output control section 13 and welding-apparatus-side input/output control section 23 of logical expression type. This data is then stored in the first memory region of input/output assignment storing section 22 of logical expression type. In the first memory region, the function for each channel and the bit (a value out of values "1" and "0" of the bit indicates whether each channel is at the input/output time) indicating that each channel is at the input/output time are stored in the same format as that in FIG. 2A. Specifically, input function 5 is assigned to input channel 1 and the value "1" of the bit at the input/output time is set in it.

As shown in logical expression input field 71 in FIG. 10, the input or output logical expression and an output destination of the result of the logical expression operation to which the result of the logical expression operation is output can be specified using an input device of PC 19. The data of them is transmitted from PC 19 to input/output assignment storing section 22 of logical expression type via input/output control section 13 and welding-apparatus-side input/output control section 23 of logical expression type. This data is then stored in the format shown in FIG. 9 in a logical expression memory of input/output assignment storing section 22 of logical expression type. The operand (variable) and operator are stored in an appropriate form by an operation by the reverse Polish notation, for example.

In the assignment of FIG. 2A, when a signal is input to input channel 1 and input channel 4, the signal is sent to input/output control section 13 via general-purpose input circuit section 11. Input/output control section 13 converts the signal into the data format of FIG. 2C. The obtained data is sent to welding-apparatus-side input/output control section 23 of logical expression type by digital communication.

In the format of FIG. 2C, the data is represented by 0 and 1 in binary notation, and one input circuit of general-purpose input circuit section 11 corresponds to one-bit data. When there are eight input circuits, data is represented as an eight-bit data string. In the data string, the left end is set as the highest-order bit, the right end is set as the lowest-order bit, and input channels 1, 2, 3, . . . , 8 are set sequentially from the lowest order.

The case where body control section 16 outputs input function 1 and input function 2 is described. Body control section 16 sends the fact that input function 1 and input function 2 are operating to welding-apparatus-side input/output control section 23 of logical expression type. Welding-apparatus-side input/output control section 23 of logical expression type executes the logical expression memories sequentially from logical expression memory 1, creates data ("00001100") having a format similar to that of FIG. 2D in response to the contents of the operation result memory, and sends the data to input/output control section 13. Input/output control section 13 performs an output to the specified channel of general-purpose output circuit section 12 based on the sent data.

The data in FIG. 2D is represented by 0 and 1 in binary notation, one output circuit of general-purpose output circuit section 12 corresponds to one-bit data. When there are eight output circuits, data is represented as an eight-bit data string. In the data string, the left end is set as the highest-order bit, the right end is set as the lowest-order bit, and output channels 1, 2, 3, . . . , 8 are set sequentially from the lowest order.

Specifically, the data is expressed by logical expression: (input channel 1+input channel 3)×(output function 1+output function 2), and an output is performed in the combination like the logical table of FIG. 9.

As discussed above, the welding system of the third exemplary embodiment allows input and output of information to the outside to be set without restraint, and allows a logical expression to be added. Therefore, this system does not require that a new device for external input/output is introduced whenever a production line is newly constructed or modified, can establish complex input/output requirements in a production line, and can perform the logical operation of a plurality of signals input from the outside.

In the first exemplary embodiment through third exemplary embodiment, input/output device 17 may be attached to a surface of welding apparatus 18. Alternatively, input/output device 17 may be disposed at a position separate from welding apparatus 18. Alternatively, input/output device 17 may be disposed inside welding apparatus 18. Thus, the electric equipment system such as a welding system can be downsized, and hence the degree of freedom of the installation place can be increased.

Since input/output device 17 can be disposed at a position separate from welding apparatus 18, the degree of freedom of the installation place of the electric equipment system can be increased.

When input/output device 17 is disposed inside welding apparatus 18, the casing of input/output device 17 is not formed, the essential configuration of input/output device 17 is disposed on a substrate or the like, and the substrate is disposed inside welding apparatus 18.

The electric equipment system of the present invention does not require that a new device for external input/output is introduced whenever a production line is newly constructed or modified, and can establish complex input/output requirements in a production line.

What is claimed is:

1. A welding system comprising:
an input/output device having a function of inputting and outputting information to an external device;
a welding apparatus arranged to communicate with the input/output device; and
an external controller for communicating with the welding apparatus via the input/output device,
wherein the input/output device is disposed at a position separate from the welding apparatus,
wherein the input/output device includes:
a general-purpose input circuit arranged to input information from the external device;
a general-purpose output circuit arranged to output information to the external device; and
an input/output control arranged to communicate with at least one of the general-purpose input circuit, the general-purpose output circuit, and the welding apparatus,
wherein the welding apparatus includes:
an input/output assignment storing section having a first memory arranged to store an assignment state of an input channel included in a plurality of input channels of the general-purpose input circuit to an input function of the welding apparatus, and to store an assignment state of an output channel included in a plurality of output channels of the general-purpose output circuit to an output function of the welding apparatus, further arranged to store whether bit data of the input signal is set at low active (0) or high active (1), and further arranged to store whether bit data of the output signal is set at low active (0) or high active (1); and
a welding apparatus-side input/output control arranged to operate the input function of the welding apparatus based on an input signal transmitted from the input/output control, or transmitting, to the input/output control, an output signal indicating which channel of the general-purpose output circuit the output function of the welding apparatus is assigned to,
wherein the input/output assignment storing section stores a logical expression for assigning input functions to the plurality of input channels and/or for assigning output functions to the plurality of output channels,
wherein the external controller transmits, to the input/output assignment storing section, an output destination to which a calculation result of the logical expression is output,
wherein the input/output assignment storing section stores the transmitted output destination,
wherein at least one of the input/output control and the welding apparatus-side input/output control is arranged to communicate with the external controller, and
wherein the welding system is arranged to store data related to an assignment in the input/output assignment storing section using the external controller, and further arranged to alter data related to the assignment stored in the input/output assignment storing section using the external controller, and is further arranged to alter data related to the bit data of the input signal and the output signal stored in the input/output assignment storing section using the external controller.

2. The welding system of claim 1,
wherein the welding apparatus includes:
a first rectifying section for rectifying an input AC voltage;

an inverter for converting an output of the first rectifying section into a high frequency wave;
a transformer for varying a voltage of an output of the inverter;
a second rectifying section for rectifying an output of the transformer; and
an output terminal for outputting an output of the second rectifying section to between an electrode for welding and a welding object,
wherein the external controller being a personal computer for communicating with the welding apparatus via the input/output device.

3. The welding system of claim 1,
wherein the welding apparatus includes:
a first rectifying section for rectifying an input AC voltage;
an inverter for converting an output of the first rectifying section into a high frequency wave;
a transformer for varying a voltage of an output of the inverter;
a second rectifying section for rectifying an output of the transformer; and
an output terminal for outputting an output of the second rectifying section to between an electrode for welding and a welding object,
wherein the external controller is configured to set a welding condition for the welding apparatus.

4. The welding system of claim 1, wherein the input/output device is disposed on a surface of the welding apparatus, the input/output device is disposed at a position separate from the welding apparatus, or the input/output device is disposed inside the welding apparatus.

5. The welding system of claim 2, wherein the input/output device is disposed on a surface of the welding apparatus, the input/output device is disposed at a position separate from the welding apparatus, or the input/output device is disposed inside the welding apparatus.

6. The welding system of claim 3, wherein the input/output device is disposed on a surface of the welding apparatus, the input/output device is disposed at a position separate from the welding apparatus, or the input/output device is disposed inside the welding apparatus.

7. A welding system comprising:
an input/output device having a function of inputting and outputting information to an external device;
a welding apparatus arranged to communicate with the input/output device; and
an external controller for communicating with the welding apparatus via the input/output device, the external controller assigning an input and an output and inputting a logical expression,
wherein the input/output device is disposed at a position separate from the welding apparatus,
wherein the input/output device includes:
a general-purpose input circuit arranged to input information from the external device;
a general-purpose output circuit arranged to output information to the external device; and
an input/output control arranged to communicate with at least one of the general-purpose input circuit, the general-purpose output circuit, and the welding apparatus,
wherein the welding apparatus includes:
an input/output assignment storing section having a first memory arranged to store an assignment state of an input channel of the general-purpose input circuit to an input function of the welding apparatus, and to store an assignment state of an output channel of the general-purpose output circuit to an output function of the welding apparatus, further arranged to store whether bit data of the input signal is set at low active (0) or high active (1), and further arranged to store whether bit data of the output signal is set at low active (0) or high active (1); and
a welding apparatus-side input/output control arranged to operate the input function of the welding apparatus based on an input signal transmitted from the input/output control, or transmitting, to the input/output control, an output signal indicating which channel of the general-purpose output circuit the function of the welding apparatus is assigned to,
wherein the input/output assignment storing section stores a logical expression for assigning input functions to the plurality of input channels and/or for assigning output functions to the plurality of output channels,
wherein the external controller transmits, to the input/output assignment storing section, an output destination to which a calculation result of the logical expression is output,
wherein the input/output assignment storing section stores the transmitted output destination,
wherein at least one of the input/output control and welding apparatus-side input/output control is arranged to communicate with the external controller, and
wherein the welding system is arranged to store data related to an assignment in the input/output assignment storing section using the external controller, and further arranged to alter data related to the assignment stored in the input/output assignment storing section using the external controller, and is further arranged to alter data related to the bit data of the input signal and the output signal stored in the input/output assignment storing section using the external controller.

8. The welding system of claim 1, further comprising a second memory region arranged to store the input and output functions of the welding apparatus in numerical sequence.

9. The welding system of claim 7, further comprising a second memory region arranged to store the input and output functions of the welding apparatus in numerical sequence.

* * * * *